United States Patent [19]

McDowell

[11] Patent Number: 4,793,069
[45] Date of Patent: Dec. 27, 1988

[54] DEVICE FOR INSTALLING ELECTRIC OUTLET BOXES

[76] Inventor: Kenneth H. McDowell, 127 Krista Ct., Chalfont, Pa. 18914

[21] Appl. No.: 61,816

[22] Filed: Jun. 15, 1987

[51] Int. Cl.[4] ............................ G01B 5/14; G01B 3/02
[52] U.S. Cl. .................................. 33/528; 33/DIG. 10
[58] Field of Search .......................... 33/DIG. 10, 528

[56] References Cited

U.S. PATENT DOCUMENTS

| 2,585,160 | 2/1952 | Munn | 33/409 |
| 3,279,080 | 10/1966 | Stepshinski | 33/DIG. 10 X |
| 3,842,510 | 10/1974 | Elliott | 33/DIG. 10 X |
| 4,126,944 | 11/1978 | Burkhart | 33/DIG. 10 X |
| 4,228,592 | 10/1980 | Badger | 33/DIG. 10 X |

Primary Examiner—Harry N. Haroian
Attorney, Agent, or Firm—Joseph W. Molasky & Assocs.

[57] ABSTRACT

A tool which provides the installer of electric outlet boxes with means for outlining on a wall or similar support the contours of a one-gang box and a two-gang box including means for pre-determining height and a leveling means for placing the contours of the box on a level with the lines of a room.

8 Claims, 1 Drawing Sheet

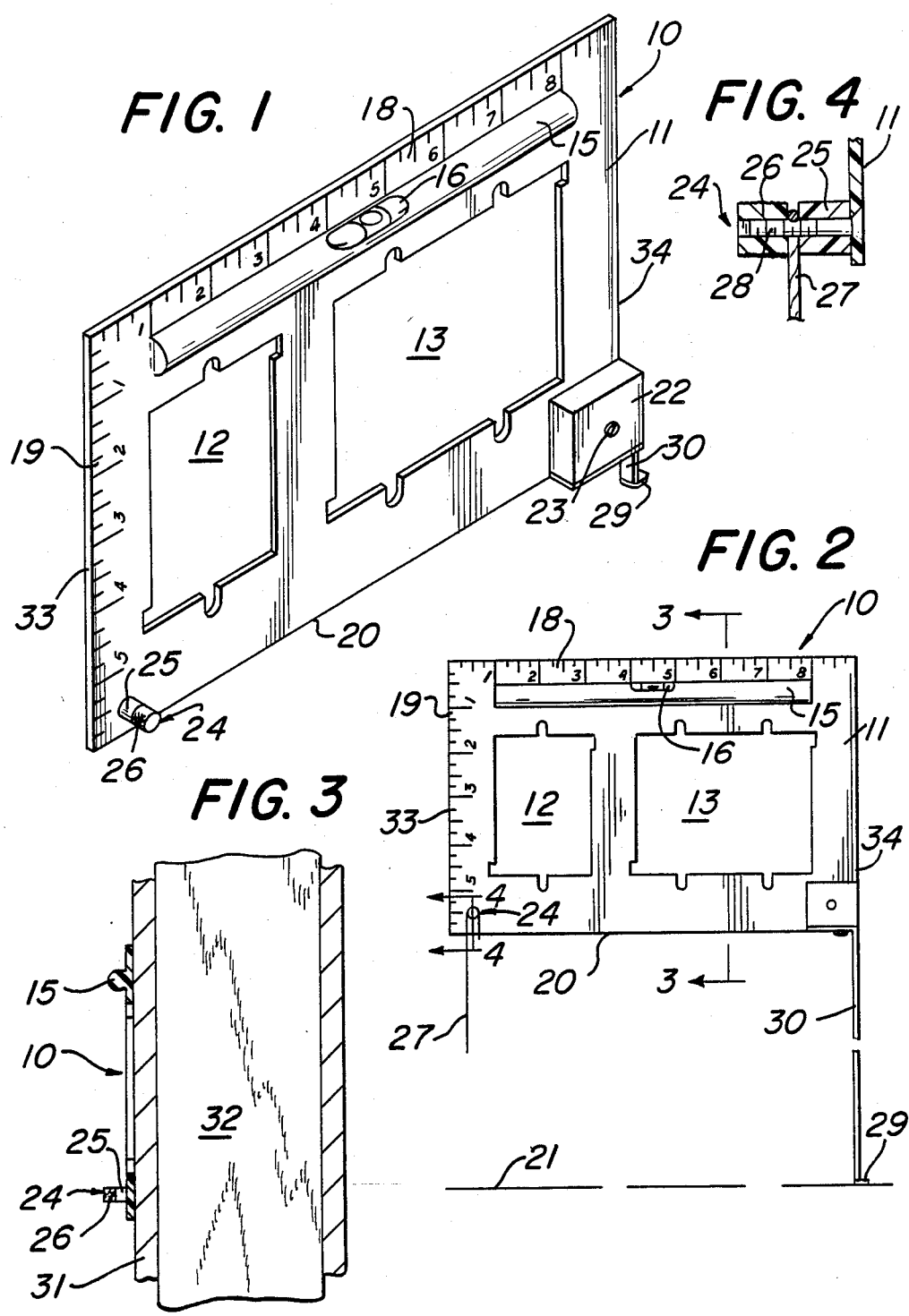

DEVICE FOR INSTALLING ELECTRIC OUTLET BOXES

This invention relates to a device which is used to prepare a wall or similar support for receiving an electric outlet box at a pre-selected height.

The device of this invention is in the form of a plate having a plurality of cutout designs and it provides the user with a practical and efficient means for installing outlet boxes at a constant height in perfect alignment with the lines of a room.

Electric outlet boxes are available in a variety of sizes, as, for example, four inch square, four and eleven-sixteenth square, three and one-half inch octagonal and four inch octagonal but the most common variety and the type which forms the basis for the present invention are the gang outlet boxes such as the one-gang box and the two-gang box.

BACKGROUND

The installation of a gang-outlet box requires an accommodating hole so that wires can be drawn therethrough and an appropriate receptacle properly mounted.

Generally, a wall is prepared for installation by impressing the face of the box against the surface of the wall and outlining its contours with a pen or pencil so that an opening can be cut to the desired specification. Unfortunately, this procedure is not always reliable because outlet boxes are cumbersome to hold and, unless extraordinary care is taken, the outline is not always on a level with the ceiling lines or baseboard.

Moreover, outlet boxes installed several to a room may be inadvertently set at varying heights so that in appearance they are unattractive to behold.

To avoid such an occurrence installers usually employ a variety of tools such as a tape measure, a level and a square or ruler; however, this procedure is defeating because tools are cumbersome to carry and the installer must outline each box by hand.

Accordingly, there is a need for a device which will allow an electrician to outline the contours of an outlet box onto a wall with a single tool in a convenient and time-efficient manner.

INVENTION

It is an object of this invention to provide a device in the form of a thin plate having cutout openings in the form of a one-gang and two-gang outlet box so that an installer may prepare a faithful reproduction of the chosen design at a pre-selected height fully leveled.

Another object is to provide a unitary device which is equipped with measuring and leveling functions so that a user can perform with a single tool all of the operations needed to install a gang-box outlet.

These and other objects are achieved by providing a relatively thin plate equipped with cutouts for outlining the contours of a one-gang box and a two-gang box onto a wall or similar flat surface. The plate includes a vertical rule, a horizontal rule, a level for adjusting the plate to true horizontal and measuring means for determining height. The plate is constructed from an elongate sheet of plastic or metal but plastic is preferred because it is less expensive, more easily tooled and does not impart unsightly marks to the wall surface.

The obverse or facing side of the plate includes two ruled segments, one along the longer edge and a second shorter rule along the traverse edge. The height measuring means, on the other hand, consists of a coiled extensible tape which can be withdrawn to determine height.

Also affixed to the plate on its obverse side is an alternate means for measuring height. This means consists essentially of a stud equipped with a threaded cap for holding in place at a desired height a light chain or a weighted line such as a string or cord. This assembly is employed by selecting a height for the outlet box placing a mark on the chain or cord the desired distance from floor level and securing the marked segment to the stud via the threaded cap. Thereafter, the assembled chain or cord is used as a measuring means by which all outlet boxes in a project can be installed. When a chain is used its weight is usually sufficient to extend the line completely and provide an accurate measurement; however, when a cord or string is employed it is preferable to attach a weight so that the line will lie straight.

The plate also includes on its face a level within an elongate member. The level consists of a glass tube in which there is contained a suitable liquid such as alcohol or ether including a movable bubble which, when centered within marks on the glass surface, can be used to set the plate at a true horizontal.

The dimensions of the present device may vary but they should be sufficient to allow for the side-by-side presentation of two or more cutouts in the form of a one-gang box and two-gang box so that the installer can select the design which is most closely analogous to the box sought to be installed.

These and other objects of the invention will become apparent from the Drawings and the description of the Preferred Embodiments which appear hereinbelow.

THE DRAWINGS

FIG. 1 is a perspective view of the device of the present invention.

FIG. 2 is a front view of the device shown in FIG. 1 as it is to be employed in practice.

FIG. 3 is a sectional view of the device shown in FIG. 2 along line 3—3.

FIG. 4 is a sectional view of the device shown in FIG. 2 along line 4—4.

This invention will now be described by reference to preferred embodiments but it will be appreciated by those skilled in the art that these are for illustration purposes only and the present invention is not to be construed as being limited thereto.

PREFERRED EMBODIMENTS

The device of this invention is a flat plate 10 having an obverse face 11 and a reverse face (not shown) unitarily formed from a suitably rigid material such as metal or plastic. The obverse or visible side is characterized by scoring and indicia in the form of a horizontal rule 18 and a vertical rule 19.

In FIGS. 1 and 3 the device is shown in a rectangular configuration measuring about 9 inches in length and 6 inches in width to allow for a side-by-side presentation of cutouts in the form of one-gang outlet 12 and a two-gang outlet 13. The cutouts are vertically aligned and conform in design to standard electrical outlets of the type used in residential and office building construction. In actuality, the one-gang cutout measures about 2⅛ inches in width and 3¼ inches in length, whereas, the two-gang outlet measures 3⅜ by 3⅛ inches.

The longitudinal segment between cutout 12 and edge 33 is identical in dimension to the segment which lies between cutout 13 and edge 34. These segments measure 1 inch in width and correspond essentially to the thickness of a conventional wall-supporting stud 32 (FIG. 3).

Immediately above said cutouts there extends outwardly from the obverse face 11 an elongate support 15 in the form of a protuberance equipped with a torpedo level 16; however, those skilled in the art will appreciate that this design is capable of modification and that said level and support may also be employed separately as discrete elements, the former as a pocket-type level and the latter as a flat shelf which extends outwardly from the obverse face 11 at a right angle (not shown). In this arrangement the level is placed upon the shelf when needed and it is removed once the reading has been completed.

Impressed onto the obverse face immediately above cutouts 12 and 13 is a horizontal rule shown generally as 18 in FIGS. 1 and 2. The rule is nine inches in length but this designation is for illustration purposes only and in actuality the device can be made larger to accommodate a larger rule if desired.

Also impressed in the obverse face is a vertical rule of six inches but this too is for illustration purposes and said rule can also be extended if desired.

Affixed to the obverse face immediately beneath cutouts 12 and 13 are alternate means for determining height. At the bottom right hand corner there is secured an extensible and retractable measure 22 from which a tape 29 can be withdrawn to set precisely the distance from the device, specifically lower edge 20, to floor level 21. The tape 29 is spring loaded and includes a stop member which is activated by bringing finger pressure to bear on pin 23 so that the withdrawn tape can be held in place in its extended mode until the measurements have been completed.

Alternatively, the user may determine height by employing the stud assembly shown generally as 24 in FIG. 1. In this assembly there is affixed to the obverse face 11 in the facing left hand corner a peg 25 and a knurled screw head 26 which may be tightened or loosened on the screw body (FIG. 4). In its operable mode a light chain or cord 27 is draped over said body 28 between peg 25 and screw head 26 and the former is held in place by threadedly engaging said head (26) on said body (28) until engagement is achieved.

This invention will now be illustrated by describing the use of the present device 10 to install a typical electrical outlet on an interior wall. The description applies specifically to outlining the contours of the outlet box shown as 12 in FIGS. 1 and 2 but it is to be understood that box 13 can be outlined in a similar manner.

The outlining procedure consists essentially of impressing the reverse side of plate 10 against the outer surface of a wall 31 in such manner that the longitudinal segment which lies between cutout 12 and edge 33 covers the wall stud 32. The tape measure 39 is then withdrawn from box 22 to the desired extent via tab 29 (FIG. 2) and the tape 30 is set in this extended mode by engaging the stop member pin 23 so that the device is set at the desired height. The level 16 is then used to establish a true horizontal mode as shown in FIG. 2.

Alternatively, in lieu of the tape measure 22 the height may be set by employing the stud assembly 24. According to this procedure a line such as a light chain or cord 27 is marked at a point which corresponds to the desired height and the marked segment is placed between peg 25 and the threaded screw head 26 where it is secured by bringing said head and said peg into threaded engagement (FIG. 4).

The device assembled in this manner is then impressed against the surface of a wall adjacent to a stud as described hereinbefore and it is so positioned that only the end of the chain or cord comes into contact with the floor or base.

Once the device has been properly positioned the installer selects the desired cutout for either a one-gang or two-gang outlet and traces the chosen outline on the wall surface. When this procedure is faithfully repeated the resulting cutouts will possess common height and level parameters.

This invention has been described by reference to precise embodiments but it will be appreciated by those skilled in the art that this invention is subject to various modifications and to the extent that those modifications would be obvious to one of ordinary skill they are considered as being within the scope of the appended claims.

What is claimed is:

1. A device for preparing a wall or similar support to receive an electrical outlet box which comprises:
    (1) a flat elongate sheet having one or more cutouts for outlining the contours of said box;
    (2) a rule extending along at least one edge of said device;
    (3) a level within an elongate protuberance which extends horizontally and outwardly from the face of said device;
    (4) an extensible tape measure secured to the face of said device; and
    (5) a peg affixed to said face and having a threaded orifice for receiving a threaded screw to which a line may be attached for measuring distances to floor level.

2. The device according to claim 1 wherein said support is a wall.

3. The device according to claim 1 wherein said level is of the torpedo type.

4. The device according to claim 1 constructed of a relatively rigid material.

5. The device according to claim 4 wherein said material is metal.

6. The device according to claim 4 wherein said material is plastic.

7. The device according to claim 1 which is rectangular in appearance and includes a cutout for a two-gang outlet.

8. The device according to claim 7 wherein said rule is imprinted horizontally onto the face of said device along a top edge and a second rule is imprinted vertically onto said face along a side edge.

* * * * *